United States Patent [19]

Hurliman et al.

[11] Patent Number: 5,082,319
[45] Date of Patent: Jan. 21, 1992

[54] LAYER CLAMP HAND WITH FLOATING SIDE CLAMPS AND CARTON FLAP HOLD-DOWN PLATEN

[75] Inventors: Russell J. Hurliman, Danville; Kenneth F. Becicka, Alvin; Neal C. Chamberlain, Hoopeston, all of Ill.

[73] Assignee: FMC Corporation, Chicago, Ill.

[21] Appl. No.: 463,690

[22] Filed: Jan. 11, 1990

[51] Int. Cl.5 ............................................. B66C 1/42
[52] U.S. Cl. ................................. 294/119.1; 294/907; 414/796.2
[58] Field of Search .................. 294/119.1, 67.3, 67.33, 294/81.6, 81.62, 87.1, 88, 907; 414/736, 751, 796.2, 796.9, 792.9, 906

[56] References Cited

U.S. PATENT DOCUMENTS

| | | | |
|---|---|---|---|
| 2,670,983 | 3/1954 | Breslav | 294/67.33 X |
| 2,874,990 | 2/1959 | Janoff | 294/119.1 |
| 3,002,779 | 10/1961 | Frate et al. | 294/119.1 X |
| 3,586,176 | 6/1971 | Rackman | 414/792.9 X |
| 3,825,293 | 7/1974 | Schwarz | 294/119.1 X |
| 4,060,955 | 12/1977 | Lachnit | 414/796.2 X |
| 4,256,429 | 3/1981 | Dwyer | 294/119.1 X |
| 4,493,599 | 1/1985 | Hartness et al. | 414/796.2 |
| 4,603,896 | 8/1986 | Vasseur et al. | 294/119.1 X |

FOREIGN PATENT DOCUMENTS

| | | | |
|---|---|---|---|
| 34817 | 2/1989 | Japan | 294/119.1 |
| 606949 | 11/1978 | Switzerland | 294/119.1 |

*Primary Examiner*—Margaret A. Focarino
*Assistant Examiner*—Dean J. Kramer
*Attorney, Agent, or Firm*—Douglas W. Rudy; Richard B. Megley

[57] ABSTRACT

A layer clamp hand for use in unloading or loading layers of product from or to a pallet is provided with side clamps that assist primary clamps in maintaining a layer of product in position on the layer clamp hand while the layer clamp hand is loading or unloading a layer of product. The side clamps are mounted and controlled such that they are insensitive to the at rest position of the layer of product to be lifted by the layer clamp hand. In addition to side clamps a carton flap hold-down platen is provided to urge flaps on cartons to be folded down to a position where the flaps would be in a folded down position normal to a fully closed carton.

5 Claims, 3 Drawing Sheets

FIG_1

FIG_2

LAYER CLAMP HAND WITH FLOATING SIDE CLAMPS AND CARTON FLAP HOLD-DOWN PLATEN

BACKGROUND OF THE INVENTION

This invention has to do with material handling equipment specifically with palletizer equipment having multi-axis hands carried on a boom, the boom carried on a mast for vertical movement while the hand is carried on the boom for transverse movement. Such palletizers and depalletizers are well known n the industry and are widely used in automated plants wherein palletized products, typically in cartons, are sent or received by a manufacturing or packaging plant.

A typical sequence in the operation of a palletizer would involve the steps of the palletizer receiving a plurality of cartons from a particular work station; picking up a row of these cartons through the use of a boom mounted clamp hand, transporting the row of cartons to a pallet state, depositing the cartons on the pallet, the returning of the clamp hand to the input conveyor for a second row of cartons, transporting those cartons to the pallet location and locating those cartons adjacent the previously deposited row of cartons on the pallet. This process wold be repeated until a layer of cartons were accumulated the pallet. Such a layer of cartons might typically be composed of three rows of cartons ad would have therefore required three "pick and place" trips by the clamp hand to construct a single layer of cartons on the pallet.

It is also known that a palletizer, with a specific clamp hand configuration can pick up more than a single row of cartons, even with the cartons arranged nonuniformly.

In another situation it has been found that it is advantageous to use a palletizer to depalletize a palletized load of product. In the depalletizing situation the product is taken off the top layer of a palletized load and transported to a take-away or other process related conveyor. This would be an appropriate material handling step or stage in, for instance, a bottling plant where cartons of empty bottles are delivered to the plant on a pallet and these cartons are then subsequently depalletized onto a conveyor leading to bottle washers, fillers, cappers, labelers and recartoners. In a typical environment; a pallet of cartons containing empty bottles, such a palletized load being upwards of nine feet tall, would be delivered to the bottling plant. At the plant a crew would be assigned to manually destack or depalletize the load of bottles and cartons by taking cartons off the top of the pallet and putting them on a take-away conveyor. As these pallets may be relatively tall, as stated above. nine feet tall it is often necessary to utilize a scaffolding system or ladder system to give the unloading person access to the upper layers of the pallet. The instant invention is designed to eliminate the manual depalletizing of cartons of product. An increase in productivity can be realized through the use of a layer clamp hand having the capability of depalletizing a pallet layer-by-layer.

The advantages of the invention presented herein will be readily apparent from a careful reading of the following specification in conjunction with an understanding of the figures presented herein.

BRIEF DESCRIPTION OF DRAWING FIGURES

DETAILED DESCRIPTION OF THE INVENTION

Figure 1:
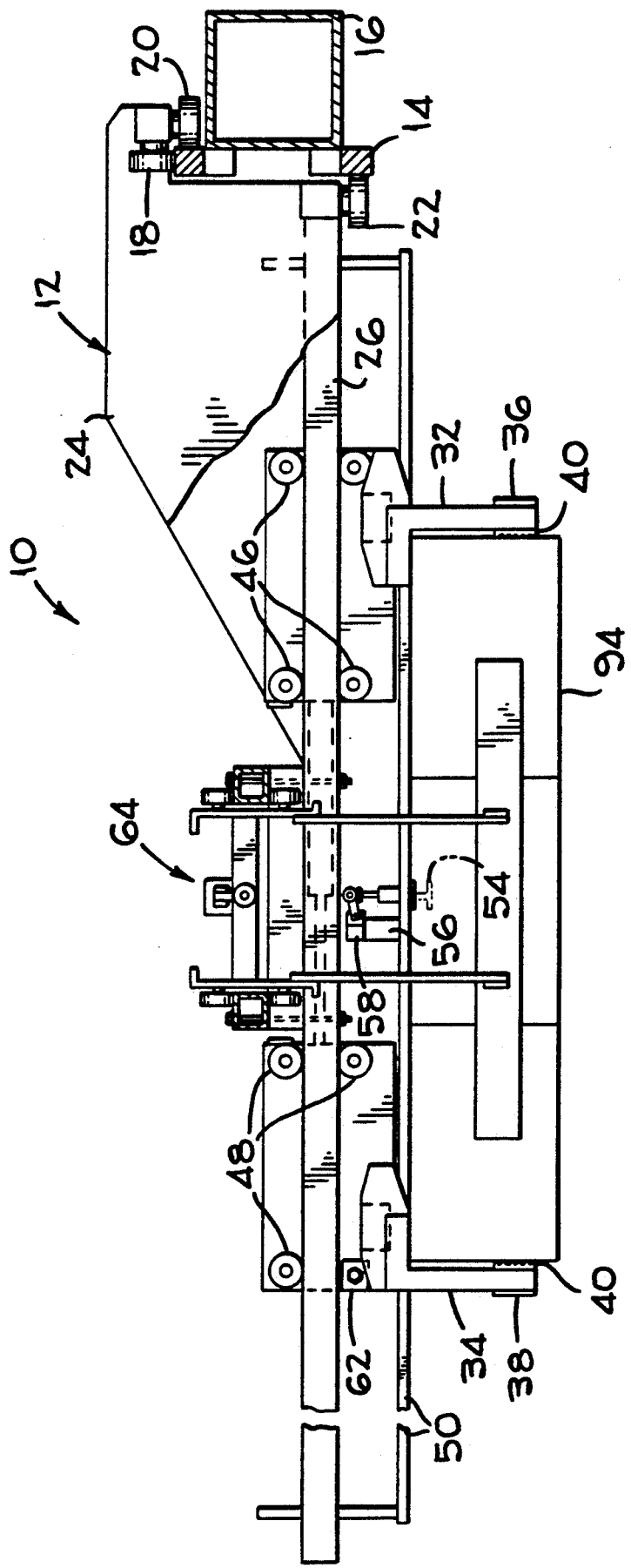
FIG. 1 is a side elevation view of the invention, with some parts sectioned.

The invention can best be understood by looking at the drawing figures wherein like reference numerals refer to like components. In FIG. 1 the general embodiment of the invention is shown generally as item 10.

Item 10 is an enhancement of a conventional Y-axis boom as used on a conventional palletizer or for that matter on a conventional depalletizer. What is also shown in this figure is the auxiliary side palm actuating mechanism generally 64 which is detailed in FIG. 3.

Figure 2:
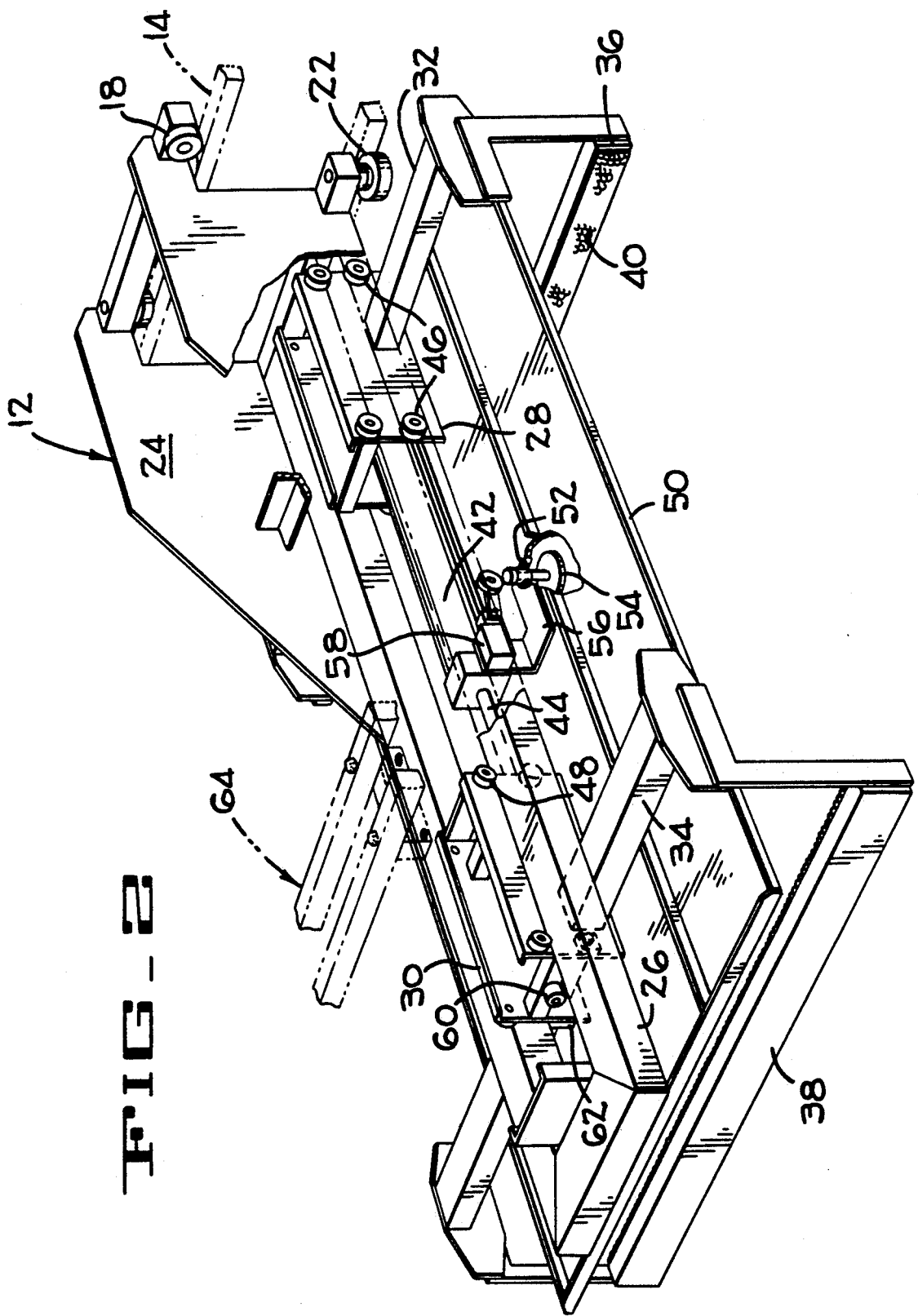
FIG. 2 is a perspective view showing the Y-axis frame and a flap engaging platen.
Figure 3:
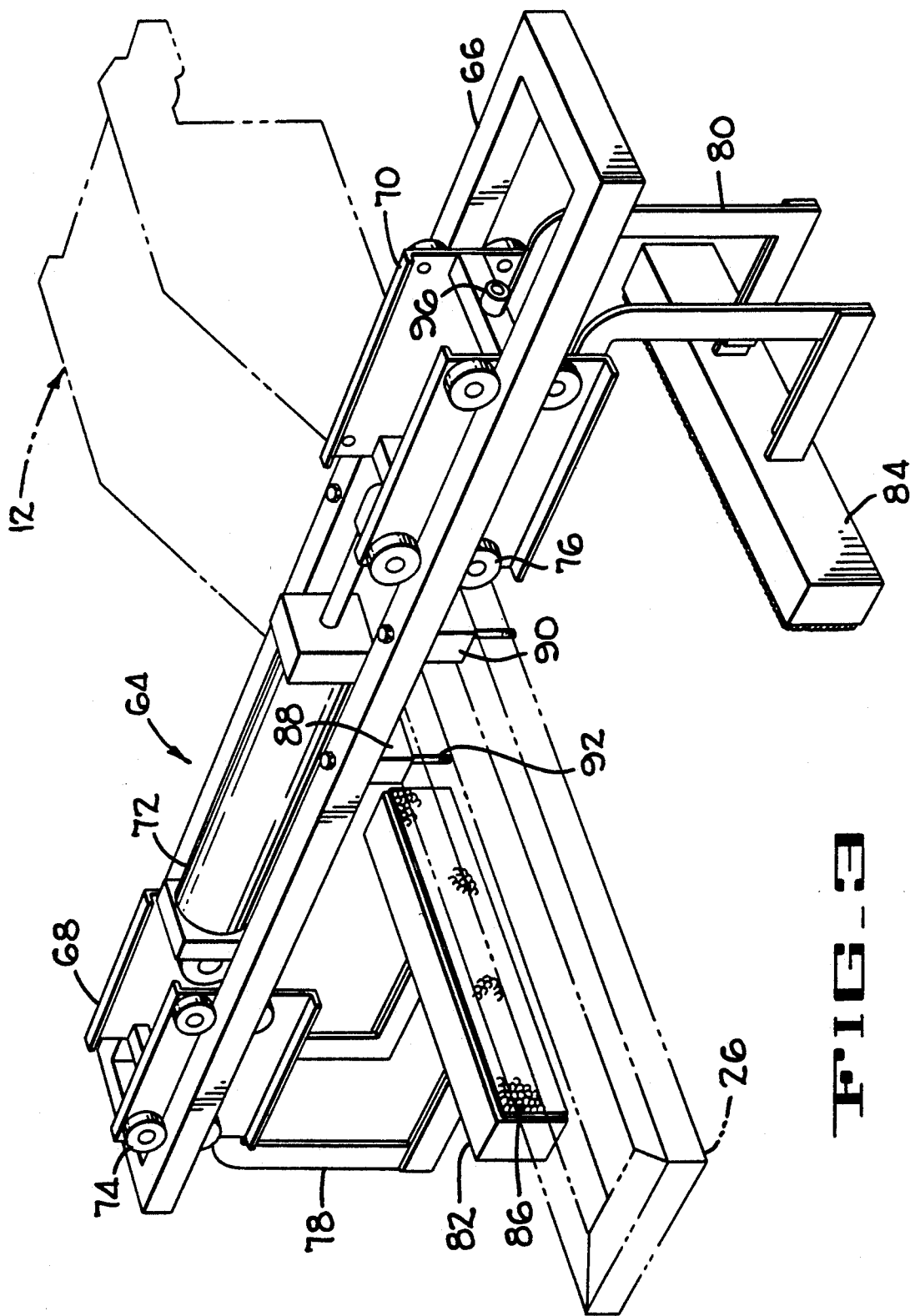
FIG. 3 is a perspective view of a side clamp for use on the Y-axis frame showing side clamps.

It would be most appropriate to first, look at the Y-axis frame in FIGS. 1 and 2 to clearly show the apparatus involved that are pertinent to that particular frame. Subsequently FIG. 3, showing the side clamp frame generally 64, will be discussed. It should be understood that the devices in FIGS. 2 and 3 are assembled together such as shown in FIG. 1 to complete the assembly of this invention. Returning to FIGS. 1 and 2, the Y-axis support generally 12 is carried on a boom, one portion of the boom shown as 14 in FIG. 1 and another portion of the boom shown as 14 in FIG. 2. The boom is supported for vertical movement on a mast 16. As is well known in the art, the boom can move vertically on the mast 16 while the Y-axis support generally 12 can freely move horizontally on the boom 14. The Y-axis support is made up of several structural elements including a Y-axis frame 26 which, in this embodiment, is a generally rectangular box beam structural steel element having two parallel legs extending from an inboard end of the Y-axis support to an outboard end of the Y-axis support where a short transverse continuation of the Y-axis frame connects the two parallel Y-axis frame members. Support flanges such as 24 are welded or otherwise fastened to the Y-axis frame members such as 26 to provide cantilever support on the boom 14 of the Y-axis frame. As shown in FIGS. 1 and 2 the Y-axis support generally 12 can move on the boom 14 while being supported on rollers such as 18 and 22.

The Y-axis frame generally 26 carries a pair of trolleys, an inboard clamp hand trolley 28 and an outboard clamp hand trolley 30 on the Y-axis frame 26. These trolleys are designed to move longitudinally on the Y-axis frame by means of rollers or wheels shown typically as 46 on the inboard trolley and typically as 48 on the outboard trolley that can contact the Y-axis frame. One set of four wheels on the inboard trolley, for instance, contacts the top surface of the Y-axis frame while a second set of wheels, again looking at the inboard trolley, contacts the lower side of the Y-axis frame and prevents the trolley from being disengaged vertically from the Y-axis frame.

The outboard trolley 30 is also provided with a set of wheels typically 48 that contact the upper surface of the Y-axis frame. On the lower portion of this outboard clamp hand trolley, however two wheels, of the set of four wheels, have been replaced with locking blocks 62 as will be explained further on. Each clamp hand trolley supports a clamp hand hanger such as the inboard clamp hand hanger 32 and the outboard clamp hand hanger 34 each of which are fastened and carried by respective inboard and outboard clamp hand trolleys. The clamp hand hangers extend from the trolley outwardly and downwardly to support respective inboard clamp hand 36 and outboard clamp hand 38. Each of these clamp hands may be provided with a grip enhancing surface 40 to assist in clamping and maintaining a secure contact with the cartons such as 94 shown in FIG. 1. The clamp hands 36 and 38 will be moved inwardly to pick up a layer of product by a trolley positioning means such as, in this preferred embodiment, an air cylinder 42. The air cylinder includes a housing end which is fastened to the inboard clamp hand trolley and a rod end at the end of rod 44 which is fixedly attached to the outboard trolley 30 Actuation of the air cylinder in the extension direction will cause the trolleys to move away from each other and, as expected, retraction of the cylinder rod into the air cylinder housing will cause the trolleys to move toward each other. Of course as the trolleys move toward each other they will bring the clamp hands 36 and 38 toward each other and into contact with the layer of cartons such as 94 which are to be picked up by the palletizer/depalletizer device.

A flap control platen 50 is carried on the Y-axis frame in a fixed manner. This platen 50 is a generally rectangular sheet of rigid material such as thin gauge steel which is designed to close down and restrain in a closed position any flaps on cartons that have sprung open or are opened when the layer clamp hand assembly is lowered onto a layer of cartons to be picked up and removed. The platen 50 may have an aperture such as 52 therein that accommodates a sensor 54 which could be a simple disk mounted on a vertically movable rod for vertical movement toward the bottom surface of the platen 50 when cartons such as 94 are in place. As shown in FIG. 1 when the sensor is extended upwardly it will cause the microswitch 58 which is supported on support 56 to be made and thus signal the controller for the depalletizer that a layer of the product is in position and further controlled sequential steps can take place. For instance the next sequential step would be to send a signal to deliver air to the air cylinder 42 such that the cylinder rod is retracted and the inboard and outboard clamp hands are moved inwardly toward the layer of product to be lifted. Shortly after initiation of that activity a signal will be sent to the air cylinder for the side clamp frame to initiate the side clamps toward the layer of product as will be described later.

The outboard clamp hand trolley 30 is equipped, as an optional device, but utilized in this preferred embodiment, with a locking block 62 in place of a pair of wheels on the lower portion of the outboard clamp hand trolley. This block will provide frictional engagement between its uppermost surface and the bottom surface of the Y-axis frame 26 and tend to resist outboard motion of the outboard clamp hand trolley once the outboard clamp hand has made significant contact with the cartons 94 on the layer to be picked up. The upper surface of the locking block is spaced a small distance away from the lower portion of the Y-axis frame and thus allows the outboard trolley to be rotated slightly clockwise as the load is being applied to the layer of cartons by the retraction of the cylinder 42. Once this block is in contact with the Y-axis frame the resistance that it provides constrains the movement of the outboard clamp hand trolley and improves the performance of the clamp hand. Of course it is possible that a wheel such as 48 in the set of wheels shown on the outboard trolley could be used in place of the locking block 62 however that embodiment might not be as advantageous as embodiment shown.

FIG. 3 shows generally the side clamp frame 64 in a solid line presentation while the Y-axis support generally 12 is shown in a phantom view. Not shown in FIG. 3 is the Y-axis frame 26 and the apparatus appurtenant thereto such as the inboard clamp hand 36, the outboard clamp hand 38, the supporting trolleys for them and the platen 50. As stated above the side clamp frame is mounted perpendicularly to the Y-axis frame such that the layer of cartons will be contacted by the inboard and outboard clamp hands as well as side clamp hands shown in FIG. 3.

FIG. 3 a horizontal frame 66 supports a left trolley and a right trolley by means of wheels such as 74 and 76 on the respective left and right trolleys in a manner similar to that utilized by the trolleys of the Y-axis frame. One difference between these trolleys and the Y-axis frame trolleys is that the locking block 62 on the outboard clamp hand trolley is not incorporated, in a preferred embodiment, into or onto the trolleys of the horizontal frame. In a preferred embodiment an air cylinder 72 is mounted with one end connected to the left trolley 68 and the other end, typically the rod end connected to the right trolley 70. Although not shown in this FIG. 3 this air cylinder would be connected to a suitable supply of air under pressure such that the piston inside the cylinder housing could be urged throughout the housing by the application of air pressure to it. Both this cylinder 72 and the cylinder 42 on the Y-axis frame operate in a similar manner and it is believed that the detail of such operation of such cylinders is so well known in the art that the various hoses and plumbing fittings to this cylinder have not been shown as they are conventional and would only serve to complicate the drawing figures.

Suspended from respective left and right trolleys are a left side palm carrier 78 and a right side palm carrier 80 which allow the attachment of a left palm and a right palm respectively thereto. These palms may be equipped with palm surfaces such as 86 that would enhance the gripping of the cartons 94 when the palms are in place against the layer of cartons.

The mounting of the side clamp frame generally 64 to the Y-axis frame 26 is accomplished by the use of a pair of spacer supports 88 and 90 interposed between the horizontal frame 66 and the Y-axis frame 26. Through bolts such as 92 would serve to attach the horizontal frame to the Y-axis frame as can be readily seen in FIG. 3.

The invention is operated as follows. Assume that a fully loaded pallet of cartons made up of multiple layers of cartons, for instance cartons containing empty bottles for filling at a beverage production facility. This fully loaded pallet would be positioned in a pallet depalletizing station. The pallet would be unloaded from the top such that the top layer of boxes would be the first ones to be unloaded. Since these boxes or cartons contain bottles lo be filled the upper flap portion of the cartons would not be sealed or otherwise fastened in a permanent position. Thus, once an overwrap structure is removed from the palletized load of cartons, it's possible that carton flaps will extend upwardly and generally complicate the positioning or unloading of the cartons. The platen 50 will be utilized to fold these flaps downwardly toward the cartons as the layer clamp hand is positioned by the depalletizer over the pallet. As the layer clamp hand descends over the open cartons the flaps will contact the bottom surface of the platen and will force the flaps into a closed position on top of the cartons. By closing these flaps the structural rigidity of the carton is improved such that the upper regions of the cartons are less easily directed inwardly toward each other.

This device is designed to pick up an entire layer of cartons at one time. In a simple environment it would be a matrix of nine cartons in a three-by-three plan. Since the only support on this layer of cartons is the clamp hands that are going to "squeeze" the cartons from the outside the cartons on the interior of the matrix which are not in direct contact with the palms of the layer clamp hands would tend to droop down and possibly disengage themselves from the layer of cartons as the entire layer is being picked up. It has been found that the use of the four palms of this invention prevents such drooping of the center cartons in a layer and allows the depalletizing of the pallet one layer at a time.

Once the platen has closed the flaps and has come to rest on the top surface of the cartons the sensor 54 and its apurtinent microswitch 58 which have been pushed up through the platen such that the switch is made will signal the master control of the unit to initiate the movement of the inboard clamp hand trolley and the outboard clamp hand trolley towards each other through actuation of the air cylinder 42. These trolleys had been "parked" outboard of the expected width of the layer of cartons at the termination of the prior cycle that the layer clamp hand went through. The control device for the layer clamp hand will then initiate actuation of the cylinder 72 to urge the left and right trolleys of the side clamp frame toward each other. The palms 82 and 84 of the side clamp frame will, in a preferred embodiment, contact the sides of the cartons after the inboard clamp hand 36 and the outboard clamp hand 38 have contacted the cartons and started to compress or clamp down on these cartons. Once both sets of palms have made contact with the sides of the cartons with a predetermined amount of clamping force the controller will then signal the layer clamp hand to lift the layer of cartons off the pallet and transport the cartons to a table or conveyor system where the cartons can be subsequently integrated into the beverage plant processing line. The master controller will first signal the air cylinder 72 to extend and thus release the grip from the sides of the layer of cartons and immediately thereafter signal the cylinder 42 to extend thereby moving its trolleys outboard and releasing the inboard and outboard clamp hands from contact with the layer. Both sets of trolleys will be moved to their extreme outboard position and possibly contact a rubber stop such as 96 in FIG. 3 or 60 in FIG. 2. The reason that the trolleys are extended to the full extent of the air cylinder travel is that it enables the layer clamp hand to easily position itself over the palletized load of product and it is not necessary to position the layer clamp hand precisely over the palletized load as there is a significant amount of leeway when the palms are all in their fully retracted position.

As can be seen by looking at FIG. 2 and FIG. 3 the inboard clamp hand and outboard clamp hand 36 and 38 respectively are relatively long compared to the left palm and the right palm 82 and 84 respectively of the side clamp frame. The reason that the left palm and the right palm are shorter in length than the inboard clamp hand and the outboard clamp hand is that it has been found that with the inboard and outboard clamp hands first contacting the full length or nearly the full length of cartons along opposed parameters of the layer thereof it is difficult to move cartons that have already been contacted by the inboard clamp hand and the outboard clamp hand inwardly upon contact with the left and right palms 82 and 84 respectively. Therefore these palms have been made shorter than the inboard and outboard clamp hands so that they don't "fight" the high frictional load already established by the inboard and outboard clamp hands in contact with the outboard surfaces of the opposed parameter of cartons. Although this is not a difficult problem when a simple matrix of nine cartons is being depalletized it is a more significant problem when a matrix of possibly 24 cartons comprise a layer of cartons to be depalletized. In this case it is important to have as much pressure exerted on the central cartons as is possible and this is facilitated by the use of shorter palms such as the left and right palms.

Thus it can be seen that there has been provided a layer clamp hand with floating side clamps and a carton flap hold down platen that provides advantages over depalletizing units that are not equipped with the platen and/or floating side palms. The following claims attempt to claim the inventors' invention in a broad manner while limiting the invention to distinguish over the prior art. The inventor contemplates that nuances of engineering design would possibly dictate slight modifications or revisions to this design however the claims attempt to claim such nuances as may be construed as being a design choice.

What is claimed is:

1. A hand assembly for use on a palletizer having a Y-axis frame assembly, said hand assembly comprising:
a primary clamp assembly including a pair of opposed primary palms movable toward and away from each other, said primary clamp assembly carried on said Y-axis frame and including a pair of trolleys, one of said trolleys being an outboard trolley having a set of wheel contacting a top surface of said Y-axis frame, a second set of wheels contacting a lower side of said Y-axis frame, and a set of locking blocks contacting said lower side of said Y-axis frame when one of said pair of opposed primary palms has made significant contact with a load;
means for moving said opposed primary palms;
a floating clamp assembly including a pair of opposed side palms movable toward and away from each other, said floating clamp assembly carried on said primary clamp assembly, said side palms carried generally perpendicularly to said primary palms.

2. The invention in accordance with claim 1 wherein a flap restraining platen is carried on said Y-axis frame between said Y-axis frame and said primary palms.

3. The invention in accordance with claim 2 wherein said pair of opposed side palms are movable by means for moving said opposed side palms.

4. The invention in accordance with claim 1 wherein said pair of opposed primary palms are significantly longer than said side palms.

5. The invention in accordance with claim 2 wherein said flap restraining in platen defines an aperture accommodating a sensor including a vertically movable rod movable through said aperture.

* * * * *